United States Patent [19]

Hirokawa et al.

[11] Patent Number: 4,582,713
[45] Date of Patent: Apr. 15, 1986

[54] METHOD FOR HEAT TREATING BROWN RICE

[75] Inventors: Tadahiko Hirokawa, Yokohama; Katsumoto Oki, Mishima; Yoh Kumagai, Yokohama; Hajime Sasaki, Ayase, all of Japan

[73] Assignees: Morinaga & Co.; Shokuhin Sangyo Center, both of Tokyo, Japan

[21] Appl. No.: 635,678

[22] Filed: Jul. 30, 1984

[30] Foreign Application Priority Data

Jul. 29, 1983 [JP] Japan .................. 58-139174

[51] Int. Cl.⁴ .................. G01N 33/02; A23L 1/10
[52] U.S. Cl. .................. 426/233; 426/467; 426/618
[58] Field of Search .............. 426/520, 462, 465, 467, 426/618, 233

[56] References Cited

U.S. PATENT DOCUMENTS 2,992,921  7/1961  Bardet et al. .................. 426/465

FOREIGN PATENT DOCUMENTS 507242  11/1954  Canada .................. 426/465

Primary Examiner—George Yeung
Attorney, Agent, or Firm—Armstrong, Nikaido, Marmelstein & Kubovcik

[57] ABSTRACT

A process for treating brown rice to obtain readily cookable brown rice having fissures in its bran layer, which process comprises developing fissures by heating the brown rice by blowing heated air to the brown rice and thereafter immediately cooling the heated rice, said heating being controlled according to the quantity of heat energy absorbed by the treated brown rice.

5 Claims, 2 Drawing Figures

METHOD FOR HEAT TREATING BROWN RICE

FIELD OF THE INVENTION

This invention relates to a process for treating brown rice or unpolished rice, more particularly to a process for treating brown rice, wherein said brown rice is made to develop fissures in the bran layer by cooling immediately after it has been heated, which is characterized in that said heating is controlled by the quantity of heat energy absorbed by said brown rice so that the brown rice treated is always fissured to a prescribed extent.

BACKGROUND OF THE INVENTION

Since the bran layer (the aleurone layer and all the outer part) of rice is hard, when brown rice as such is cooked in the usual manner, water can hardly penetrate into the interior of the rice grain, so that there is formed half-cooked rice which is hard on account of the fact that the gelatinization cannot completely reach the endosperm. Accordingly, rice is usually cooked in the form of polished rice in which the bran layer has been removed.

However, since the bran layer of rice contains abundantly vitamins, minerals, and fibrous material, it is desirable to use brown rice as such for food, and thus various methods for cooking rice have been developed, such as the method using an autoclave, the method of reboiling, or similar special methods. However, when using an autoclave, procedures such as adjusting the pressure or controlling the fire, etc. are not easy, and moreover, the loss of the nutrient ingredients may not be ignored, while the method of reboiling not only requires much labor and time but also damages the nutrient ingredients.

Thus, any of the methods of cooking brown rice, which have heretofore been employed, is not desirable, and actually these methods are not utilized much. Especially for the reason that these methods are unsuitable for daily practice in the home, brown rice is rarely consumed.

It is known however that even in such brown rice, if the hard bran layer is fissured, moisture can readily penetrate into the endosperm so that cooking is also readily achieved, and therefore, some methods of developing fissures in the bran layer of brown rice have heretofore been proposed.

One of the most suitable among them is a method in which brown rice is treated in such a manner that immediately after it has been heated while it is in a fluidized state by virtue of hot air it is cooled (Japanese Pat. No. 1077284). This method provides brown rice in uniform quality of which the bran layers of all the rice grains have uniformly several streaks of fissure, brown rice, even when cooked in the usual manner like polished rice, makes nice cooked rice since moisture penetrates through the fissures into the endosperm until the interior of the rice grain is thoroughly gelatinized. Also this treated brown rice can be cooked satisfactorily in admixture with polished rice. Although the above described method is considerably good, it is not possible to ensure that all the brown rice treated even by this method is always of evenly good quality.

That is to say, in some cases too many fissures are formed, but in other cases fissures are insufficient. And further, treatment using the same conditions in the temperature, heating time, etc. of the hot air resulted in brown rice that differed in quality or in the mode of fissuring from lot to lot on account of the fact that the moisture, ingredients, properties of the bran layer, etc. of the brown rice varied depending on the kind, brand, place of production, year of production, and other characteristics of the brown rice used as raw material, so that the bran layer of the brown rice could not be made to develop fissures to a desired extent.

Thus, when the brown rice treated in quite the same manner is cooked under the same conditions, the cooked rice produced is uneven in hardness owing to the difference in the amount of moisture absorbed by the endosperm in each lot. Therefore, in order to make brown rice pleasantly palatable when cooked, though it may be cooked under almost the same conditions as in polished rice, the amount of the water added in cooking as well as the cooking time, etc. should all be varied according to the lot. Such a method is too unsatisfactory to be adapted for practical use.

The present inventors made an earnest investigation to develop a process for treating brown rice which can always make the bran layer of brown rice develop fissures to such an extent as desired irrespective of the variation in the kind, brand, etc. of the brown rice used as the raw material and which can prepare the brown rice such that it can always be readily cooked under the same conditions. As it was discovered that when the heat treatment for the brown rice is controlled by the quantity of heat energy absorbed by said brown rice, one can always produce treated brown rice of uniform quality whose bran layer has fissured to a desired extent, this invention was accomplished.

SUMMARY OF THE INVENTION

The present invention is directed to a process for treating brown rice to obtain readily cookable brown rice, whereby fissures are developed in the bran layer of rice by heating the brown rice by blowing heated air through the brown rice in a fluidized state and thereafter immediately cooling the heated rice, which process further comprises treating said brown rice to develop the fissures to a desired extent in such a way that said heating is controlled by the quantity of heat energy absorbed by the treated brown rice. The object of this invention is to provide a process for treating brown rice which can convert said brown rice into one which has uniform fissures and can be readily cooked the same manner as in polished rice.

When brown rice is treated maintaining the heat energy absorbed at 60 kcal or more per 1 kg of brown rice, there is obtained brown rice which can be cooked like polished rice in the usual manner.

The present invention is also directed to an apparatus for practicing the above described process, which comprises a heating device of fluidized bed type for heating brown rice, a cooling device for the heated brown rice, a transporting device which links the discharge port of the contents of said heating device with the charge port of the raw material of said cooling device for rapidly transporting the heated brown rice to said cooling device, temperature sensors mounted on said heating device for measuring the temperatures of the heated air passing through the inlet and the outlet of said heated air, a flow meter for measuring the flow rate of the heated air at the inlet, and a means for calculating the quantity of heat energy absorbed by the brown rice in said heating device based on the data received from said temperature sensors as well as said flow meter, and when said quantity of heat energy has reached the pre-established value, stops the blowing of heated air, opens the valve for discharging the contents of said heating device, so as to remove the heated brown rice to said cooling device, and gives instructions to actuate said cooling device.

DETAILED DESCRIPTION OF THE PREFERRED EMBODIMENT OF THE INVENTION

Figure 1:
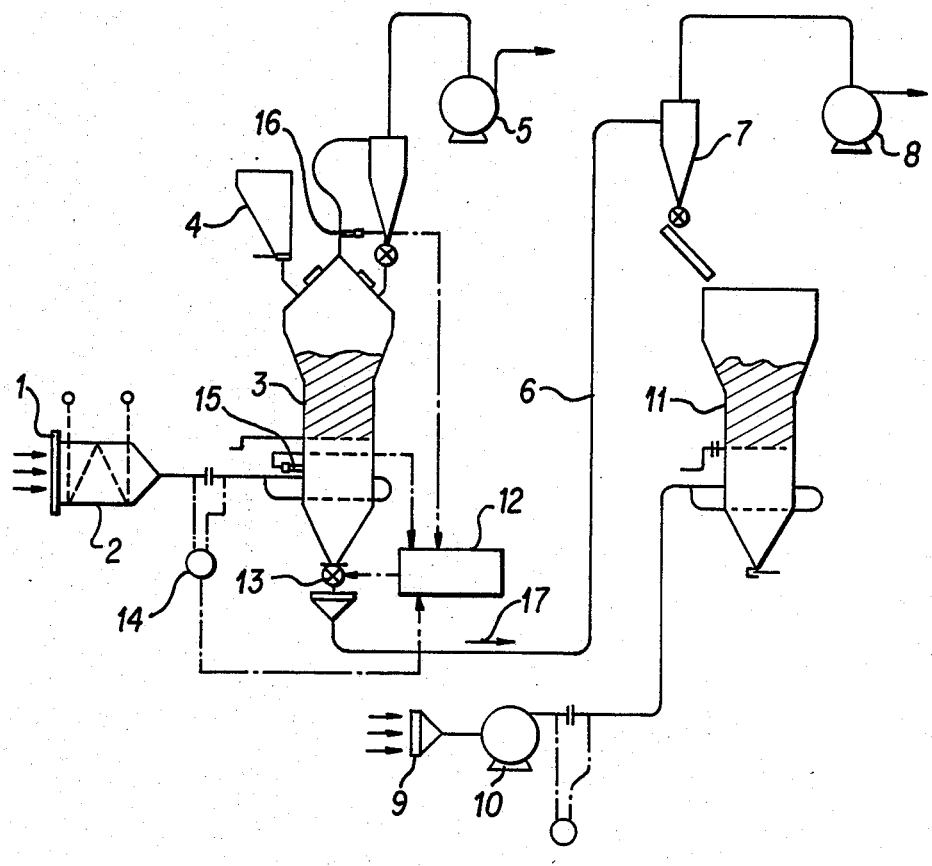
FIG. 1 illustrates diagrammatically one embodiment of the apparatus of this invention for practicing the process of this invention.

The process according to this invention is carried out in such a manner that brown rice is placed in a fluidizing apparatus, for instance, such as a drying apparatus of batchwise fluidized bed type, and heated by blowing heated air thereinto while said brown rice is in a fluidized state, and then, if the data obtained by measuring the quantity of heat energy absorbed by brown rice indicates that it has reached the pre-established value the heating is controlled to be stopped and immediately thereafter cooling is done.

It is most preferable that the quantity of heat energy absorbed by brown rice is found by directly measuring the temperature of said brown rice elevated by the heating and obtaining the product of this temperature and the specific heat of said brown rice.

However, as it is practically impossible to accurately measure the temperature of the brown rice which is being heated in a fluidized state within the apparatus, the quantity of heat energy absorbed by the brown rice may be estimated from the difference between the quantities of heat energy of the air observed at its charge port and discharge port.

That is to say, it may be calculated by subtracting the quantity of heat energy obtained by measuring the flow rate and the temperature of the air effluent from the heating device and the correction values for the quantity of heat energy consumed by the heating device itself from the quantity of heat energy obtained by measuring the flow rate and the temperature of the heated air influent to the heating device, as illustrated by the following calculation.

Difference between influent air
temperature and effluent air temperature: $TT$ (°C.)
$TT = T_1 - T_3$ ($T_1$: influent air temperature,
$T_3$: effluent air temperature)
Density of air: $AL$ (kg/m²)

$$AL = \frac{0.001293}{1 + 0.00367 \times T_1} \times \frac{H}{760} \times 1000$$

($H$: atmospheric pressure (mmHg))
Flow rate: $VE$ (m³/min.)

$$VE = 0.644 \times 0.00486 \times \frac{2 \times 9.8 \times \Delta h}{AL} \times 60$$

($\Delta h$: pressure loss)
Specific heat at constant pressure of air: $CP(J/g \cdot K)$
$CP = 0.00000070833 \times T_1^2 + 0.000022498 \times T_1 + 1.0061666$
Density of air: $SG$ (g/m³)

-continued $$SG = \frac{0.001293}{1 + 0.00307 \times T_1} \times \frac{H}{760} \times 10^6$$

Heat capacity of air: $RO$ (kcal/m³)

$$RO = \frac{CP \times SG}{4.185 \times 1000}$$

Quantity of heat used after an interval of measurements: $CA$ (kcal)
$CA = RO \times TT \times VE \times (J_1 - J_0) \div 60$
($J_1 - J_0$: interval of measurements)
Energy absorbed: $E$ (kcal)
$E = CA - \Delta E$ The absorbed heat energy is the accumulation, as calculated with elapsed time, of E obtained by correcting CA with the energy loss $\Delta E$ proper to each apparatus.

In the above equation $\Delta E$ is a correction value for a heating device, and varies from device to device, but such a correction value can be readily calculated by those skilled in the art.

When the quantity of heat energy absorbed by brown rice at the time of heating is controlled to be 60 kcal or more per 1 kg of brown rice, the treated brown rice always can be readily cooked in the usual manner. If the quantity of heat energy absorbed is less than 60 kcal, the fissures formed in the bran layer of the brown rice are so insufficient the the rice cannot be readily cooked. Of course, in the case where less fissure is preferable, the heat energy absorbed may be reduced. Although increasing the quantity of heat energy absorbed does not affect the quality of the treated brown rice, the heat energy increased more than necessary is a mere loss of energy. Usually it will suffice to use up to about 130 kcal.

The temperature of the heated air being blown may be chosen as desired but when it is too high the surface of the brown rice may be scorched before the desired heat energy is absorbed, while when it is too low, the heating takes too much time. Thus, the temperature should preferably be 90°–170° C. Also, the heating time may be calculated by taking into consideration the temperature of the heated air and the actual quantity of energy absorbed, when the heating time is too short, even though the energy absorbed has reached a predetermined quantity calculated, in reality the brown rice cannot absorb that quantity of heat energy, so that the heating time should preferably be 5 minutes or more.

FIG. 1 illustrates diagrammatically the apparatus for practicing the process of this invention. In the figure, 3 is heating device, 11 is cooling device, and 6 is transporting device for transporting heated brown rice from said heating device 3 to said cooling device 5. When brown rice is thrown into heating device 3 through hopper 4, the air heated with heater 2 after passing through filter 1 is sent to heating device 3, in which said heated air heats the brown rice while stirring it in a fluidized state and then is discharged from the top of said heating device. The temperatures of the air blown into heating device 3 and the air discharged from heating device 3 are continually measured by means of temperature sensors 15 and 16 that are respectively mounted at the charge port and the discharge port of the air, and the data thus obtained is sent to computer 12. The flow rate of the heated air to heating device is measured by orifice-meter 14 mounted at the charge port of the heated air, and the data thus obtained is also sent to computer 12.

By virtue of a program in which the correction values for the heating device have been pre-established, computer 12 calculates the quantity of heat energy absorbed by the treated brown rice within heating device 3 with the passage of time from the data in said program, and when the quantity of heat energy absorbed by the brown rice has reached the pre-established value, gives instructions to stop the operation of blower 5 as well as to open valve 13 for sending the brown rice to cooling device. The brown rice sent to cooling device 11 through cyclone 7 is immediately cooled to below 30° C. by the cooling air sent through blower 10. As the individual devices used in this invention any conventional devices can be used.

This invention will be more fully explained by reference to the following examples which are not intended to limit the scope of the invention.

EXAMPLES 1–19

In the apparatus as shown in FIG. 1, which comprises a heating device of fluidized bed type as a heating device, a blast cooling device of fluidized bed type as a cooling device, a pneumatic conveyor as a transporting device, electric-resistance thermometers as temperature sensors, and an orifice-meter mounted immediately before one of the temperature sensors, brown rices varying in the place of production, kind, and year of production were treated as shown in Table 1.

The quantity of heat energy absorbed was found by the above described calculation formula. Also, the correction value $\Delta E$ was found by sending heated air in the absence of brown rice.

The respective brown rices were made to absorb the quantity of heat energy shwon in Table 1 under the heating conditions shown in the same table.

After the heating was complete, the brown rice was immediately transferred to the cooling device, and cooled for 5 minutes by an air current at 20° C. in every case, whereafter the treated brown rice was obtained.

424 parts by weight of each of the brown rices treated in this way was cooked along with 576 parts by weight of water after water washing by the use of an electric cooking-pot for rice (Toshiba RC-10 B), and after the automatic switch was turned off the cooked rice was allowed to settle by its own heat for 20 minutes. The water content of the cooked rice is shown in Table 1.

The cooked rice was also fed to 10 to test whether it has an appetizing taste, and the result of the taste test is shown in Table 1.

Figure 2:
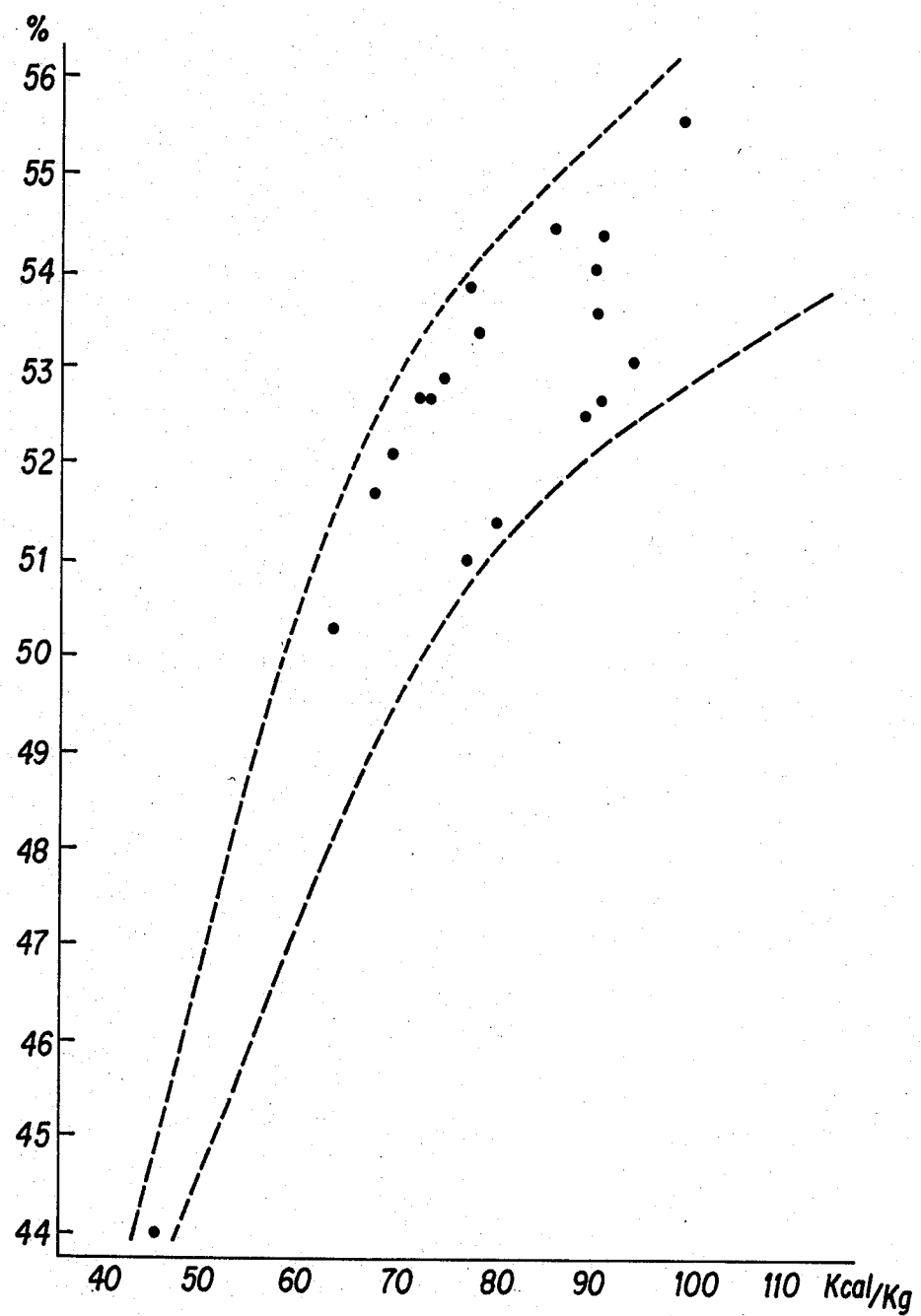
FIG. 2 represents graphically the relation between the quantity of heat energy absorbed and the water content of the cooked rice in Examples 1–19.

The relation between the respective quantities of heat energy absorbed in Examples 1–19 and the water contents is graphically shown in FIG. 2.

TABLE 1

| Example No. | Quantity of energy absorbed Kcal/Kg | Temperature of heated air °C. | Heating time min. | Year of production | Place of production | Variety | Water content of cooked rice wt. % | Results of taste test Number of persons who commented favorably | Number of persons who commented unfavorably |
|---|---|---|---|---|---|---|---|---|---|
| 1 | 103 | 140 | 10:40 | 1982 | Akita Pref., Japan | Akinishiki | 53.2 | 9 | 1 |
| 2 | 99 | 130 | 14:10 | 1981 | Tochigi Pref. Japan | Akinishiki | 55.6 | 10 | 0 |
| 3 | 94 | 150 | 8:20 | 1982 | Akita Pref., Japan | Akinishiki | 53.1 | 7 | 3 |
| 4 | 91 | 130 | 10:10 | 1981 | Niigata Pref. Japan | Akihikari | 54.4 | 9 | 1 |
| 5 | 90 | 130 | 20:30 | 1982 | Akita Pref., Japan | Akinishiki | 54.1 | 8 | 2 |
| 6 | 90 | 140 | 14:00 | 1981 | Aomori Pref., Japan | Akihikari | 52.7 | 7 | 3 |
| 7 | 90 | 140 | 17:00 | 1982 | Akita Pref., Japan | Akinishiki | 53.6 | 8 | 2 |
| 8 | 89 | 130 | 12:00 | 1982 | Akita Pref., Japan | Akinishiki | 52.5 | 8 | 2 |
| 9 | 86 | 130 | 7:00 | 1981 | Aomori Pref., Japan | Akihikari | 54.5 | 10 | 0 |
| 10 | 80 | 140 | 8:50 | 1982 | Akita Pref., Japan | Akinishiki | 51.4 | 6 | 4 |
| 11 | 78 | 130 | 12:30 | 1981 | Yamagata Pref, Japan | Sasanishiki | 53.4 | 8 | 2 |
| 12 | 77 | 130 | 11:40 | 1981 | Shiga Pref., Japan | Kinpa | 53.9 | 10 | 0 |
| 13 | 76 | 130 | 12:00 | 1981 | Chiba Pref., Japan | Toyonishiki | 51.0 | 6 | 4 |
| 14 | 74 | 130 | 11:10 | 1981 | Yamagata Pref, Japan | Himenomochi | 52.9 | 8 | 2 |
| 15 | 73 | 150 | 7:00 | 1981 | Niigata Pref., Japan | Hanahikari | 52.7 | 7 | 3 |
| 16 | 72 | 130 | 11:10 | 1981 | Iwate Pref., Japan | Yukihikari | 52.7 | 7 | 3 |
| 17 | 69 | 130 | 10:40 | 1981 | Iwate Pref., Japan | Nameless | 52.1 | 8 | 2 |
| 18 | 68 | 140 | 8:00 | 1981 | Gunma Pref., Japan | Akinishiki | 51.7 | 7 | 3 |
| 19 | 63 | 140 | 7:40 | 1981 | Hyogo Pref., Japan | Hounen | 50.3 | 4 | 6 |
| Comparative Exam- | 45 | 140 | 9:30 | 1981 | Hyogo Pref., Japan | Kinmaze | 44.0 | 0 | 10 |

TABLE 1-continued

| Example No. | Quantity of energy absorbed Kcal/Kg | Temperature of heated air °C. | Heating time min. | Year of production | Place of production | Variety | Water content of cooked rice wt. % | Results of taste test | |
|---|---|---|---|---|---|---|---|---|---|
| | | | | | | | | Number of persons who commented favorably | Number of persons who commented unfavorably |
| ple | | | | | | | | | |

EXAMPLES 20-27

As raw material "Nihon-bare" brown rice produced in Ibaraki-prefecture, Japan, was used and this rice was treated in the same manner as in Example 1 except that the quantity of heat energy absorbed was respectively maintained at 45 kcal, 55 kcal, 65 kcal, 75 kcal, 85 kcal, and 100 kcal. All of these treated brown rices were cooked in the same manner as in Example 1. The water content after the cooking was as shown in Table 2. Also, the taste test of the respective cooked rices was carried out in the same manner as in Example 1, with the result being shown together in Table 2.

The treated brown rices in Examples 20 and 21 were cooked with water added in an amount increased by 30% over the first time. The water contents of the cooked rices then obtained and the result of the taste test are shown in Table 3.

TABLE 2

| Example No. | Quantity of energy absorbed Kcal/Kg | Temperature of heated air °C. | Heating time | Water content of cooked rice wt % | Result of taste test | |
|---|---|---|---|---|---|---|
| | | | | | Number of persons who commented favorably | Number of persons who commented unfavorably |
| 20 | 44 | 110 | 5'50" | 44.8 | 0 | 10 |
| 21 | 54 | 110 | 8'00" | 47.8 | 3 | 7 |
| 22 | 66 | 120 | 9'10" | 52.1 | 8 | 2 |
| 23 | 76 | 120 | 11'30" | 52.9 | 8 | 2 |
| 24 | 85 | 130 | 11'40" | 53.2 | 10 | 0 |
| 25 | 101 | 130 | 13'50" | 53.6 | 10 | 0 |
| 26 | 110 | 140 | 13'20" | 53.9 | 10 | 0 |
| 27 | 119 | 150 | 13'40" | 54.4 | 10 | 0 |

TABLE 3

| Example in which the brown rice used was obtained | Water content of cooked rice % | Result of taste test | |
|---|---|---|---|
| | | Number of persons who commented favorably | Number of persons who commented unfavorably |
| 20 | 48.3 | 2 | 8 |
| 21 | 52.3 | 5 | 5 |

The above results indicate that by controlling the quantity of heat energy absorbed by brown rice, any brown rice whatever can be made to develop fissures in the bran layer thereof to any desired extent without being affected by the differences in the kind other characteristics of the brown rice. Thus by making the quantity of heat energy absorbed by the treated brown rice larger than 60 kcal, one can obtain brown rice which can be readily cooked in the same manner as in polished rice and is always of evenly good quality.

In addition, as to the brown rice which was treated by maintaining the quantity of heat energy absorbed at less than 60 kcal, when cooked in the usual manner, no matter how much water may be added, it cannot give a cooked rice which is rich in water content and having an appetizing taste like cooked rice obtained from brown rice made to develop fissures in its bran layer by treating at more than 60 kcal of heat energy absorbed.

We claim:

1. In a process for treating brown rice to obtain readily cookable brown rice comprising blowing heated air through brown rice in a heating device so as to fluidize and at the same time heat said brown rice whereby fissures are developed in the bran layer of the brown rice, and thereafter immediately cooling the heated rice, the improvement wherein the quantity of heat energy absorbed by the brown rice is automatically controlled to at least 60 kcal per kilogram of untreated brown rice, said automatic control comprising:

(1) continuously monitoring by means of temperature sensors the temperature of the heated air entering said heating device and the temperature of the air discharged from the heating device;

(2) measuring the flow rate of heated air entering the heating device; and (3) Continuously calculating the quantity of heat energy absorbed by the brown rice from the monitored temperatures and the measured flow rate, comparing the calculated value with a desired value of at least 60 kcal per kilogram of untreated brown rice, and stopping the operation of blowing heated air on the brown rice when the calculated quantity of heat energy absorbed by the brown rice has reached the desired value.

2. The process as defined in claim 1, wherein said quantity of heat energy absorbed by the brown rice is more than 60 kcal and less than 130 kcal per kg of untreated brown rice.

3. The process as defined in claim 1, wherein the temperature of the heated air entering said heating device is 90°-170° C.

4. The process as defined in claim 1, wherein the heating time is automatically controlled to be at least 5 minutes.

5. The process as defined in claim 1, wherein the temperature of the cooling step is below 30° C.

* * * * *